N. JOHNSON.
RETURNING MECHANISM FOR HAY CARRIERS.
APPLICATION FILED MAY 18, 1908.
907,809.
Patented Dec. 29, 1908.
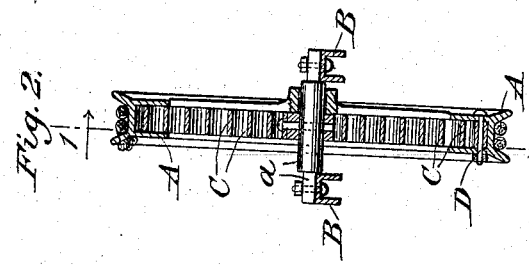
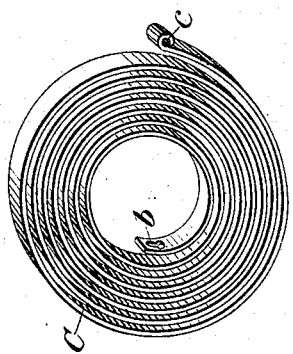
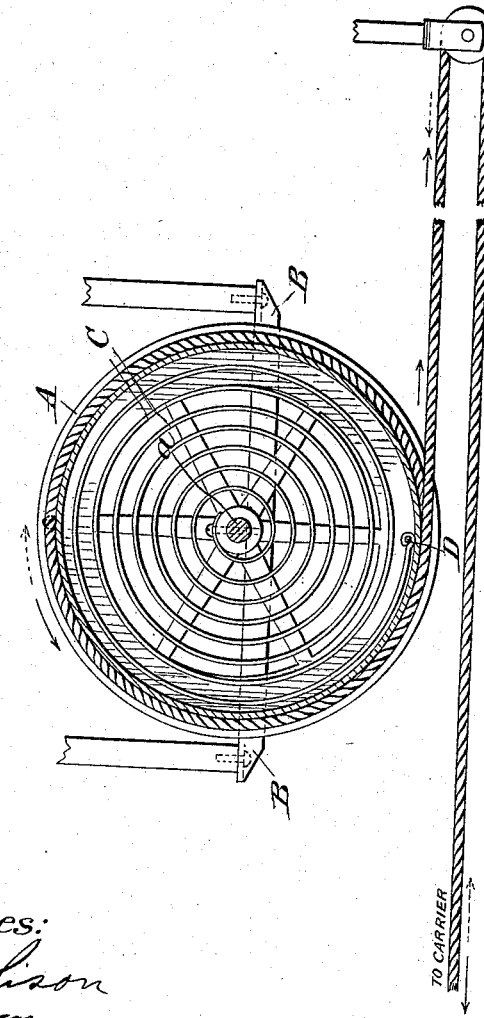
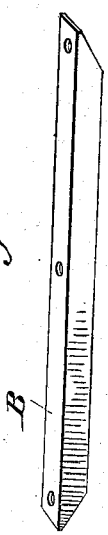
Witnesses:
Inventor:
Nels Johnson

UNITED STATES PATENT OFFICE.

NELS JOHNSON, OF HUNTER, NORTH DAKOTA.

RETURNING MECHANISM FOR HAY-CARRIERS.

No. 907,809.

Specification of Letters Patent.

Patented Dec. 29, 1908.

Application filed May 18, 1908. Serial No. 433,598.

*To all whom it may concern:*

Be it known that I, NELS JOHNSON, residing at Hunter, in the county of Cass and State of North Dakota, have invented a new and Improved Returning Mechanism for Hay-Carriers, of which the following is a specification.

My invention has for its purpose to provide a simple and effective means for automatically returning a hay carrier back in position to lock after the same has been tripped to dump the load, and my said invention comprehends, generally, a flanged wheel or sheave to which one end of the carrier rope is fastened to wind thereon, said sheave being loosely mounted on a shaft, and a spring device that is fixedly connected at one end to the shaft and at the other end to the wheel in such manner that when drawing the carrier rope forwardly, for dumping, tension is applied on the spring that serves to rotate the wheel and wind up the rope to pull the carrier back to lock into the track after the load is dropped and the hay line is unhitched.

In its subordinate features, my invention consists in certain details of construction and peculiar combination of parts, all of which will be fully explained, specifically pointed out in the appended claims and illustrated in the accompanying drawing, in which, Figure 1, is a vertical, longitudinal section of my invention, the pull direction of the rope being indicated by the full line arrows, and the automatic return direction indicated by dotted line arrows, the said view being taken on line 1—1 on Fig. 2. Fig. 2, is a transverse vertical section thereof. Fig. 3, is a perspective view of one of the shaft supports B. Fig. 4, is a perspective view of the actuating spring hereinafter referred to.

In the practical application of my invention, when the same is used in a barn having a hay fork, it is preferably mounted adjacent the hay door and alongside of the usual track, and the same is supported on bed plates B—B that are secured at their ends by bolts that attach them to the track supporters, as indicated in Fig. 1.

Mounted on the bed plates B—B is a shaft $a$ that is fixedly held thereon by the bolts and nuts as clearly shown in Figs. 1 and 2, by reference to which it will be also observed that upon the shaft $a$ is loosely mounted a flange wheel or sheave A having spokes set to one side of the rim, whereby to provide for an internal space to receive the helical or clock spring C, one end of which is fastened to the shaft and its other end is fastened to the inside face of the wheel rim, the latter having annular inwardly extending flanges whereby to provide an annular socket in which seats the outermost coils of the springs and which serves to properly guide the said springs and take off undue lateral strain at the outer or circumferential portions thereof.

From the foregoing, taken in connection with the drawing the complete arrangement, the manner of use and the advantages of my invention will be readily apparent.

I have not shown the carrier or the loader, or the locking device that holds the carrier locked, pending the delivery of the holder to the point of discharge, since these parts are a well-known type and require no special assembling of parts to render my invention operable.

It will be noticed that my invention is exceedingly simple and since its returning action is almost entirely automatic it effects a considerable saving of time and labor for unloading the hay and carrying it to the point of delivery.

While I have particularly described my invention as especially adapted for returning the hay carrier to its starting point, it may be used for various other purposes, where no returner power is used.

Having thus described my invention, what I claim and desire to secure by Letters Patent is:—

1. The combination with a suitable support, a shaft fixedly held thereon, a flanged wheel loosely mounted on the shaft, said flanged wheel also having inwardly projecting flanges, a helical spring having one end secured to the shaft, wound about the shaft, its free end being made fast to the internal rim of the wheel; of a carrier pull rope, and guides therefor, said rope taking around the wheel and having one end fastened to the rim thereof.

2. The combination with hangers, a pair of bed plates mounted upon the lower ends of the hangers, a shaft disposed transversely of and fixedly mounted upon the said bed plates, a flanged wheel loosely mounted on the shaft, said wheel having inwardly extended annular flanges whereby to form an annular internal socket, a helical spring mounted in the said socket, one end of which is secured to the internal rim of the wheel, the other end of the spring being made fast to the shaft, all being arranged substantially as shown and described.

NELS JOHNSON.

Witnesses:
A. S. PEWLISON,
E. B. MOREY.